(12) United States Patent  (10) Patent No.: US 8,907,922 B2
Liu  (45) Date of Patent: Dec. 9, 2014

(54) TOUCH SENSITIVE IPS LIQUID CRYSTAL DISPLAY

(71) Applicant: TPK Touch Solutions Inc., Taipei (TW)

(72) Inventor: Chen-Yu Liu, Jhongli (TW)

(73) Assignee: TPK Touch Solutions Inc., Taipei (TW)

( * ) Notice: Subject to any disclaimer, the term of this patent is extended or adjusted under 35 U.S.C. 154(b) by 0 days.

(21) Appl. No.: 13/903,992

(22) Filed: May 28, 2013

(65) Prior Publication Data

US 2013/0257805 A1   Oct. 3, 2013

Related U.S. Application Data

(62) Division of application No. 12/557,514, filed on Sep. 10, 2009, now Pat. No. 8,471,828.

(30) Foreign Application Priority Data

Jun. 19, 2009 (TW) ............................... 98120566 A (51) Int. Cl.
*G06F 3/045* (2006.01)
*G02F 1/1333* (2006.01)
*G02F 1/1343* (2006.01)
*G06F 3/044* (2006.01)
*G06F 3/041* (2006.01)

(52) U.S. Cl.
CPC ...... *G06F 3/041* (2013.01); *G06F 2203/04111* (2013.01); *G06F 3/045* (2013.01); *G02F 1/13338* (2013.01); *G02F 1/134363* (2013.01); *G06F 3/044* (2013.01)
USPC .......................................................... 345/174

(58) Field of Classification Search
None
See application file for complete search history.

(56) References Cited

U.S. PATENT DOCUMENTS

2009/0322702 A1* 12/2009 Chien et al. .................... 345/174
2010/0225598 A1*  9/2010 Shen ............................. 345/173

* cited by examiner

*Primary Examiner* — Nicholas Lee
(74) *Attorney, Agent, or Firm* — Gokalp Bayramoglu (57) ABSTRACT

A touch sensitive in-plane switching (IPS) liquid crystal display (LCD) includes a liquid crystal layer, an active-matrix transistor layer with an electrode pair, a color filter substrate, and a sensing electrode layer. The sensing electrode layer may be disposed above or below the color filter substrate, and the sensing electrode layer may include two parts that are disposed above and below the color filter layer respectively.

20 Claims, 10 Drawing Sheets

TOUCH SENSITIVE IPS LIQUID CRYSTAL DISPLAY

CROSS-REFERENCE TO RELATED APPLICATIONS

This application is a Divisional Application of Ser. No. 12/557,514 filed Sep. 10, 2009 by the present inventors, which is incorporated herein by reference.

BACKGROUND OF THE INVENTION

1. Field of the Invention

The present invention generally relates to a touch panel, and more particularly to a touch sensitive in-plane switching (IFS) liquid crystal display (LCD).

2. Description of the Related Art

Touch panels and touch screens have been widely used in electronic devices, particularly portable and hand-held electronic devices such as personal digital assistants (PDA) and mobile telephones. Touch panels incorporate sensing technology (such as resistive, capacitive, or optical sensing technology) and display technology. Maturing liquid crystal display (LCD) developments further facilitate the integration of sensing technologies with the LCD.

Figure 1:
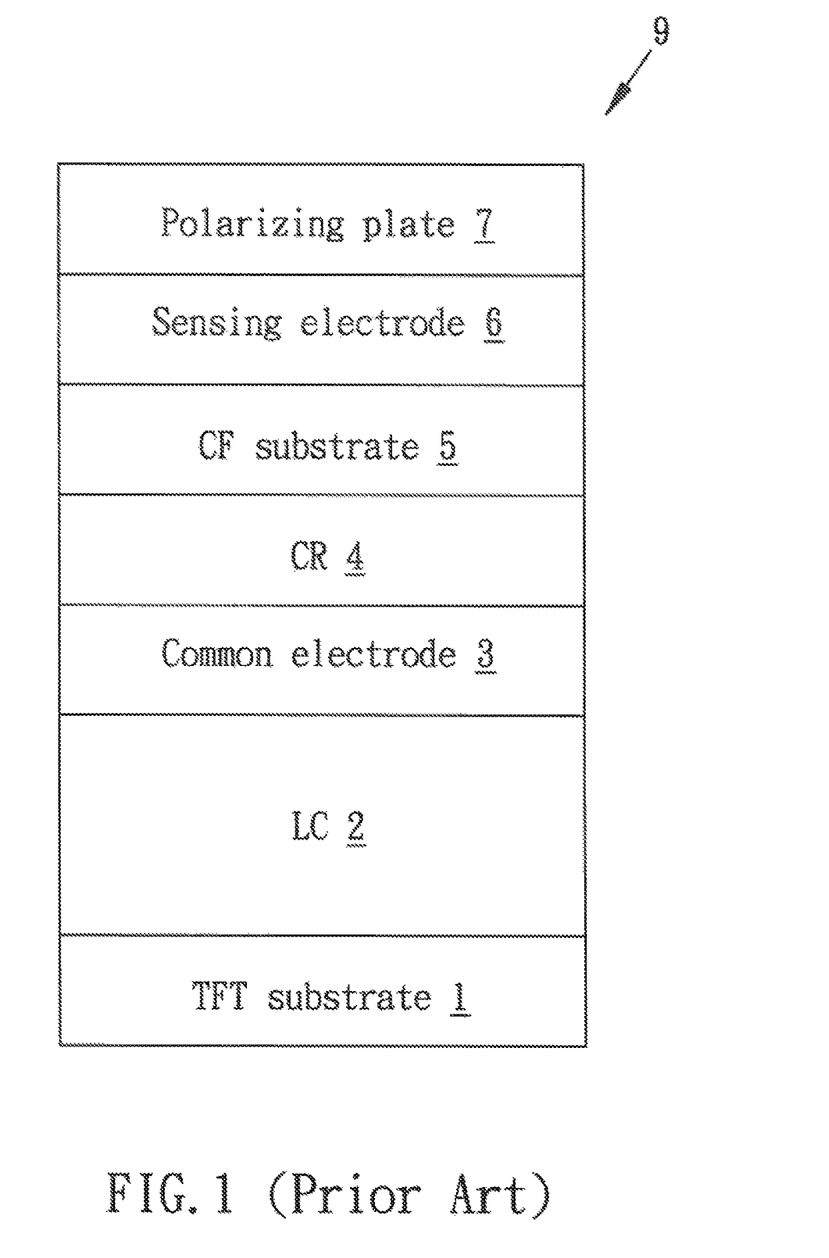
FIG. 1 is a cross-sectional view showing the structure of a conventional touch sensitive liquid crystal display (LCD).

FIG. 1 is a cross-sectional view showing the structure of a conventional touch sensitive LCD 9, as disclosed for example, in U.S. Pat. No. 6,259,490 entitled "LIQUID CRYSTAL DISPLAY DEVICE" or U.S. Patent Application Publication No. 2007/0242054A1 entitled "LIGHT TRANSMISSION TOUCH PANEL AND MANUFACTURING METHOD THEREOF." As shown in FIG. 1 the touch sensitive LCD 9 includes, from bottom to top a thin-film transistor (TFT) substrate 1, a liquid crystal (LC) layer 2, a common electrode layer 3, a color resist (CR) layer 4, a color filter (CF) substrate 5, a sensing electrode layer 6, and a polarizing plate 7. According to the structure of the conventional touch sensitive LCD 9, in which both the common electrode layer 3 and the sensing electrode layer 6 are disposed above the LC layer 2, high background capacitance adversely affect the sensing electrode layer 6, thereby decreasing the performance and accuracy of the touch sensitive LCD 9. Furthermore, regarding the structure of the conventional touch sensitive LCD 9, an electric field of the LC layer 2 also adversely affects the touch performance and accuracy of the sensing electrode layer 6.

As the conventional touch sensitive LCD suffers from suboptimal sensing performance and accuracy, a need exists to propose a novel touch sensitive LCD that is capable of providing one or more of improved sensing performance and accuracy.

SUMMARY OF THE INVENTION

In view of the foregoing, embodiments of the present invention provide a touch sensitive in-plane switching UPS) liquid crystal display (LCD) which is operative to improve sensing performance and accuracy. The embodiments disclose structures concerning a sensing electrode layer, which for example can be free of or less affected by high background capacitance. Moreover, the embodiments disclose substitution or sharing between a composing layer of the LCD and the sensing electrode layer. Furthermore, a shielding layer is disclosed for reducing an electric-field effect on the sensing electrode layer from the liquid crystal (LC) layer.

The IPS LCD, according to the embodiments of the present invention, includes a liquid crystal layer, an active-matrix transistor layer with an electrode pair (e.g., a pixel electrode and a common electrode), a color filter substrate, and a sensing electrode layer. According to a first embodiment, the sensing electrode layer may be disposed above the color filter substrate. According to a second embodiment, the sensing electrode layer may be disposed below the color filter substrate. According to a third embodiment, the sensing electrode layer may include two parts that are disposed above and below the color filter layer respectively.

Aspects of the embodiments embody the sensing electrode layer as including multiple electrode layers or a single electrode layer. According to an aspect of some embodiments, the connecting conductive line of the sensing electrode layer may be shared with a black matrix layer, and an insulating layer may be shared with a color resist layer. According to a further aspect, the shielding layer may be shared with a black matrix layer.

BRIEF DESCRIPTION OF THE DRAWINGS

Many aspects of the present embodiments can be better understood with reference to the following drawings. The components in the drawings are not necessarily to scale, emphasis instead being placed upon clearly illustrating the principles of the present implementations. In the drawings, like reference numerals are used to designate corresponding parts throughout the several views.

DETAILED DESCRIPTION OF THE INVENTION

Figure 2:
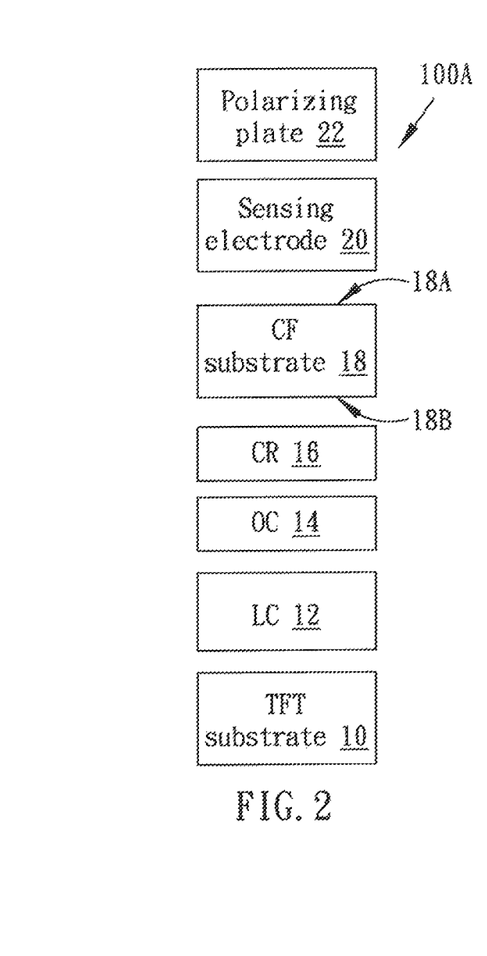
FIG. 2 is a cross-sectional view of a touch sensitive in-plane switching (IPS) LCD according to a first embodiment of the present invention.

FIG. 2 is a cross-sectional view of a touch sensitive in-plane switching (IPS) liquid crystal display (LCD) 100A abbreviated as the touch sensitive display hereinafter, according to a first embodiment of the present invention. Terms such as "above"/"below" and "top"/"bottom" in this specification are used to represent relative directions. With respect to the figures accompanying this description tops and bottoms of the depicted touch sensitive displays appear nearer to and further from the viewer respectively. Capacitive sensing is utilized in the embodiments of the present invention to detect touch positions according to capacitance variations at the touch points of a user's finger or stylus.

The structure and display mode of the touch sensitive display according to the present embodiments implement IPS, which is distinct from other display modes owing at least to the following differences. Both the common electrode layer and the pixel electrode of the IPS LCD are disposed below the liquid crystal (LC) layer, while the common electrode layer and the pixel electrode of other type LCDs are disposed above and below the LC layer respectively. Due to the specific structure of the IPS LCD, background capacitance can be reduced, thereby decreasing or preventing the disturbance affecting sensing capability, and improving sensing performance and accuracy.

According to the first embodiment shown in FIG. 2, the touch sensitive display 100A includes, from bottom to top, an active-matrix transistor (such as thin-film transistor or TFT) substrate 10, an LC layer 12, an over coating (OC) layer 14, a color resist (CR) layer 16, a color filter (CF) substrate 18, a sensing electrode layer 20, and a polarizing plate 22. An additional layer or layers may be inserted between the aforementioned composing layers according to particular applications or functions. Specifically, an electrode pair can be at, or set (e.g., disposed) on, the TFT substrate 10. The electrode pair includes a pixel electrode and a common electrode. A laterally horizontal electric field is generated between the pixel electrode and the common electrode for controlling the orientation of the liquid crystals of the LC layer 12 to achieve an IPS display mode. The OC layer 14 is used to prevent the ions of the CR layer 16 from entering into and thus contaminating the LC layer 12. The OC layer 14 may contain acryl resin, epoxy resin, and/or another material. The CR layer 16 may contain Poly-vinyl alcohol (PVA), acryl pigment, and/or another pigment/dye for forming a red/green/blue (RGB) color pattern. The CF substrate 18 is a transparent substrate that may contain glass, high molecular plastic (such as Polycarbonate (PC) or Polyvinylchloride (PVC)), and/or another material. The polarizing plate 22 may contain PVA and/or another material. The structure and the material of the sensing electrode layer 20 will be discussed later in the specification.

One aspect of the first embodiment (FIG. 2) is that, with respect to structure, the sensing electrode layer 20 is disposed between the CF substrate 18 and the polarizing plate 22, or, in other words, above the CF substrate 18. Specifically, the sensing electrode layer 20 is disposed above the first (top) surface 18A of the CF substrate 18, and the CR layer 16 is disposed below the second (bottom) surface 18B of the CF substrate 18.

Figure 3:
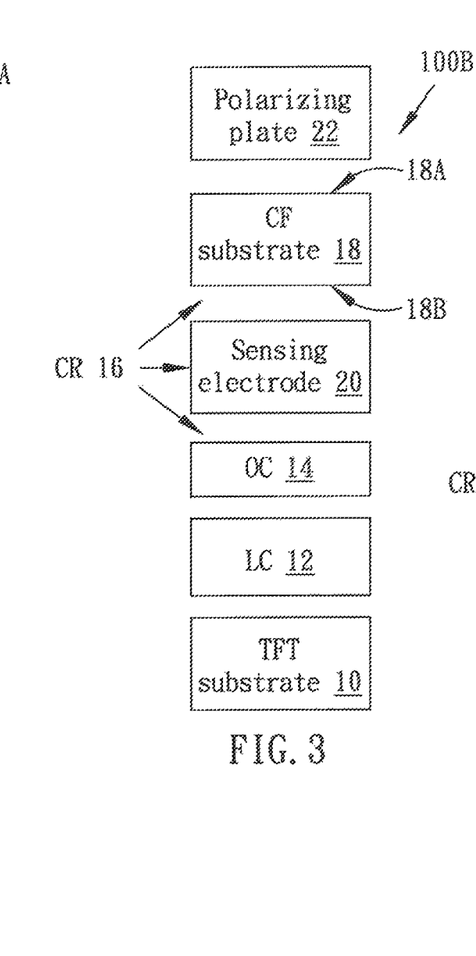
FIG. 3 is a cross-sectional view of a touch sensitive IPS LCD according to a second embodiment of the present invention.

FIG. 3 is a cross-sectional view of a touch sensitive IPS LCD 100B according to a second embodiment of the present invention. In the embodiment, the touch sensitive display 100B includes, from bottom to top, an active-matrix transistor (such as TFT) substrate 10, an LC layer 12, an OC layer 14, a sensing electrode layer 20, a CF substrate 18, and a polarizing plate 22. A CR layer 16 may be disposed between the OC layer 14 and the sensing electrode layer 20; or may be disposed between the sensing electrode 20 and the CF substrate 18; or may even be disposed in the sensing electrode layer 20, as indicated by the arrows. An additional layer or layers may be inserted between the aforementioned composing layers according to particular applications or functions.

One aspect of the second embodiment (FIG. 3) is that, with respect to structure, the sensing electrode layer 20 is disposed between the CF substrate 18 and the OC layer 14, or, in other words, below the CF substrate 18. Specifically, the sensing electrode layer 20 is disposed below the second (bottom) surface 18B of the CF substrate 18, and the polarizing plate 22 is disposed above the first (top) surface 18A of the CF substrate 18.

Figure 4:
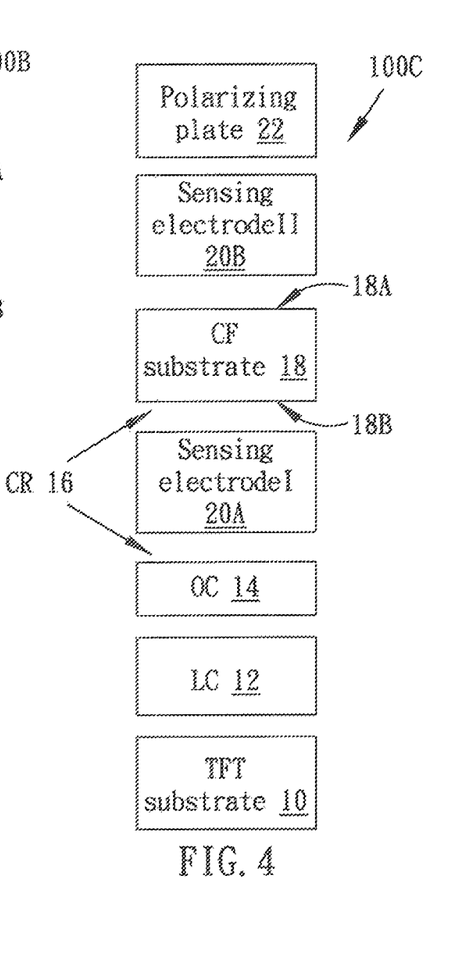
FIG. 4 is a cross-sectional view of a touch sensitive IPS LCD according to a third embodiment of the present invention.

FIG. 4 is a cross-sectional view of a touch sensitive IPS LCD 100C according to a third embodiment of the present invention. In the embodiment, the touch sensitive display 100C includes, from bottom to top, an active-matrix transistor (such as TFT) substrate 10, an LC layer 12, an OC layer 14, a first (I) sensing electrode layer 20A, a CF substrate 18, a second (II) sensing electrode layer 20B, and a polarizing plate 22. A CR layer 16 may be disposed between the OC layer 14 and the first sensing electrode layer 20A; or may be disposed between the first sensing electrode 20A and the CF substrate 18, as indicated by the arrows. An additional layer or layers may be inserted between the aforementioned composing layers according to the particular application or function.

One aspect of the third embodiment (FIG. 4) is that, with respect to structure, the sensing electrode layer is divided into two parts: the first sensing electrode layer 20A and the second sensing electrode layer 20B which are disposed between the OC layer 14 and the CF substrate 18 and between the CF substrate 18 and the polarizing plate 22, respectively. Specifically, the second sensing electrode layer 20B is disposed above the first (top) surface 18A of the CF substrate 18, and the first sensing electrode layer 20A is disposed below the second (bottom) surface 18B of the CF substrate 18.

With respect to the aspects of the first, the second, and the third embodiment, the sensing electrode 20 of the first embodiment (FIG. 2) is disposed above the CF substrate 18; the sensing electrode 20 of the second embodiment (FIG. 3) is disposed below the CF substrate 18; and the first and the second sensing electrode 20A/20B of the third embodiment (FIG. 4) are disposed below and above the CF substrate 18, respectively.

Figure 5A:
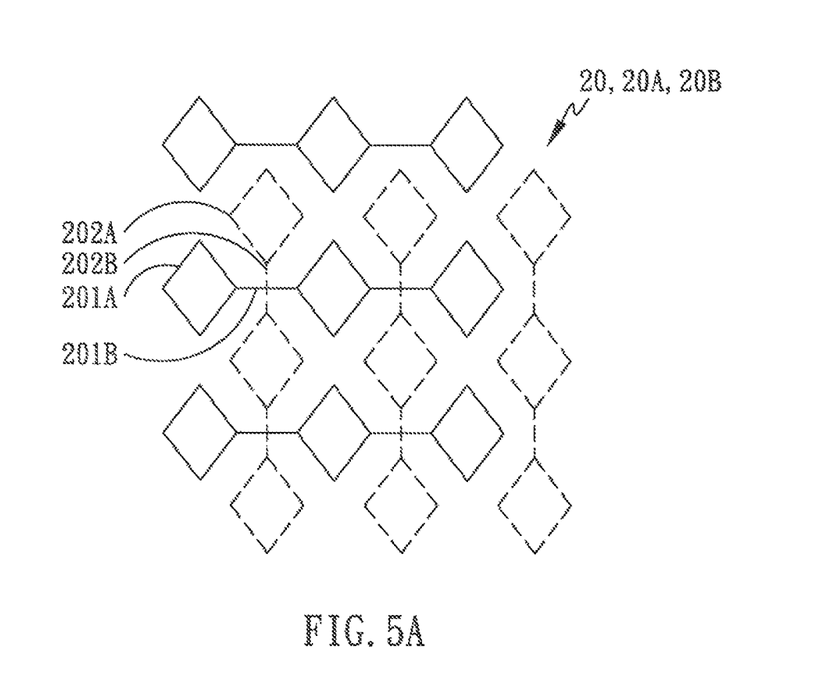
FIG. 5A is a top view showing an electrode pattern of multiple electrode layers.

With respect to the sensing electrode layer 20/20A/20B of the embodiments (FIG. 2/FIG. 3/FIG. 4), the sensing electrode layer 20/20A/20B may include multiple electrode layers or a single electrode layer. Each electrode layer may include a number of sensing electrodes. The electrode layer may include transparent conductive material such as, but not limited to, Indium Tin Oxide (ITO), Aluminum Zinc Oxide (AZO), and/or Indium Zinc Oxide (MO). FIG. 5A is a top view showing an electrode pattern of multiple electrode layers, which include first sensing electrodes 201A along a first axis (e g. X axis) and second sensing electrodes 202A along a second axis (e.g. Y axis). First connecting conductive line (or bridging conductive line) 201B is connected between the neighboring first sensing electrodes 201A along the first axis, and second connecting conductive line 202B is connected between the neighboring second sensing electrodes 202A along the second axis. In the exemplary figure, the sensing electrodes 201A and 202A have, but are not limited to, a shape of rhombus in general, no matter whether the first sensing electrode 201A and the second sensing electrode 202A are located on the same level or not, insulating material need be disposed between the overlapping connecting conductive lines 201B and 202B in order to prevent shorting in an overlapping area between the lines 201B and 202B. The X and Y coordinates of a touch point may be detected according to the second-axis sensing electrodes 202A and the first-axis sensing electrodes 201A. The multiple electrode layers exemplified in FIG. 5A may be adapted to act as the sensing electrode layer 20 in the touch sensitive display 100A of the first embodiment (FIG. 2) or the touch sensitive display 100B of the second embodiment (FIG. 3). Further, the first-axis sensing electrodes 201A and the second-axis sensing electrodes 202A may be adapted to act as the first sensing electrode layer 20A and the second sensing electrode layer 20B, respectively, of the touch sensitive display 100C of the third embodiment (FIG. 4). In this specification, the terms "first-axis," "X-axis," and "first" may be used interchangeably, and the terms "second-axis" "Y-axis," and "second" may be used interchangeably. The aforementioned connecting conductive line 201B or the first-axis sensing electrode 201A may be substituted with a black matrix (BM) layer.

Figure 5B:
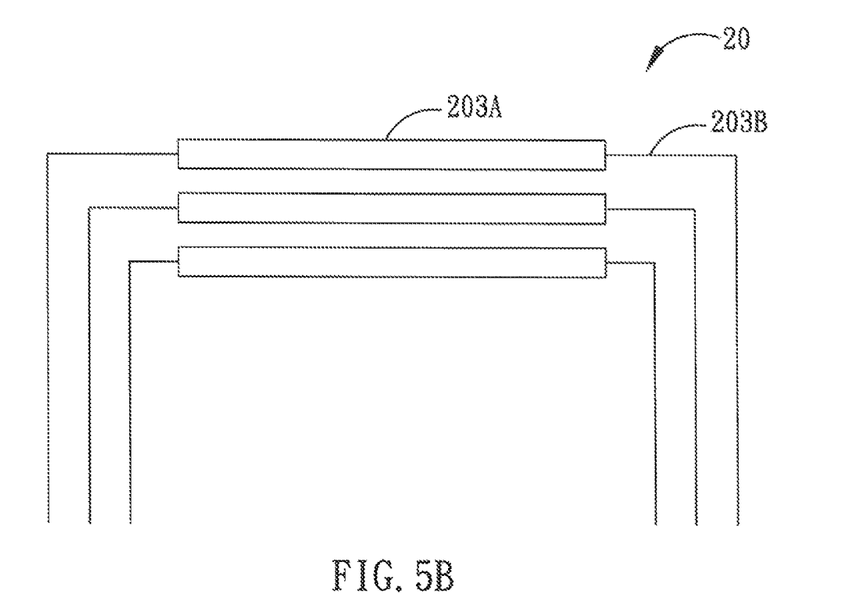
FIG. 5B is a top view shot an electrode pattern of a single electrode layer.

FIG. 5B is a top view showing an electrode pattern of a single electrode layer, which includes a number of elongated sensing electrodes 203A that are spaced apart from each other. The two ends of each sensing electrode 203A are coupled to conductive lines 203B respectively (or, alternatively, a single conductive line 203B that is integrated with each sensing electrode 203A). Whenever the sensing electrode 203A is touched, two ends of the sensing electrode 203A result in different impedance values respectively and may then be utilized to detect X coordinate, and the location of the sensing electrode 203A is used to detect Y coordinate. The single electrode layer exemplified in FIG. 5B may be adapted to act as the sensing electrode layer 20 in the touch sensitive display 100A of the first embodiment (FIG. 2) or the touch sensitive display 100B of the second embodiment (FIG. 3).

Figure 5C:
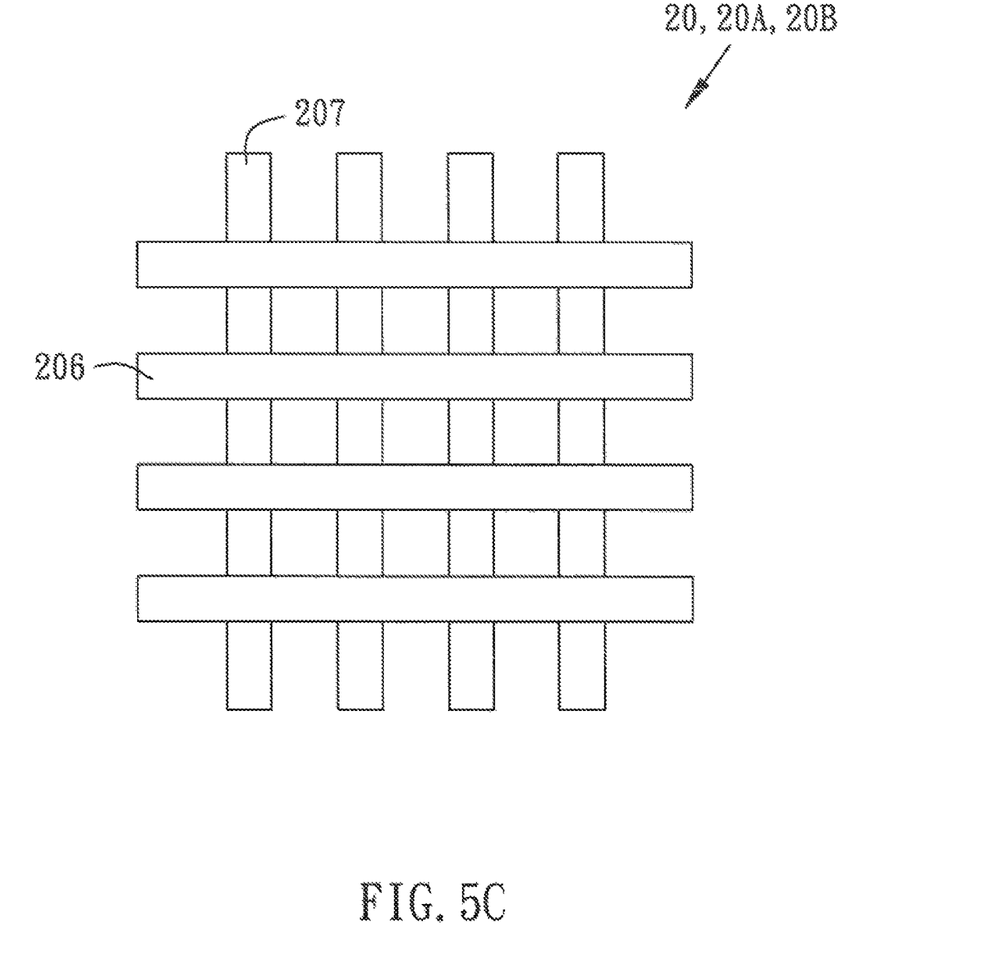
FIG. 5C is a top view showing another electrode pattern of multiple electrode layers.

FIG. 5C is a top view showing another electrode pattern of multiple electrode layers, which include first-axis (e.g., X-axis) elongated first sensing electrodes 206 that are parallelly spaced apart from each other and second-axis (e.g., Y-axis) elongated second sensing electrodes 207 that are parallelly spaced apart from each other. The X and Y coordinates of a touch point may be detected according to the elongated first sensing electrodes 206 and the elongated second sensing electrodes 207. Insulating material may or need be disposed between the elongated first sensing electrodes 206 and the elongated second sensing electrodes 207 in order to prevent shorting between the electrodes 206 and 207. The multiple electrode layers exemplified in FIG. 5C may be adapted to act as the sensing electrode layer 20 in the touch sensitive display 100A of the first embodiment (FIG. 2) or the touch sensitive display 100B of the second embodiment (FIG. 3). Further, the elongated first sensing electrodes 206 and the elongated second sensing electrodes 207 may be adapted to act as the first sensing electrode layer 20A and the second sensing electrode layer 20B respectively, of the touch sensitive display 100 of the third embodiment (FIG. 4).

Figure 6A:
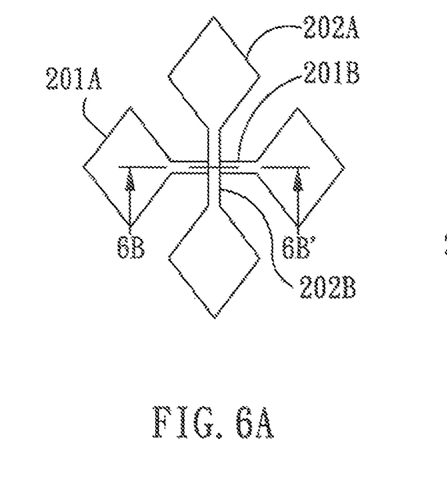
FIG. 6A and FIG. 6B show an electrode pattern of multiple electrode layers, in which two axial sensing electrodes are disposed on different levels respectively.
Figure 6B:
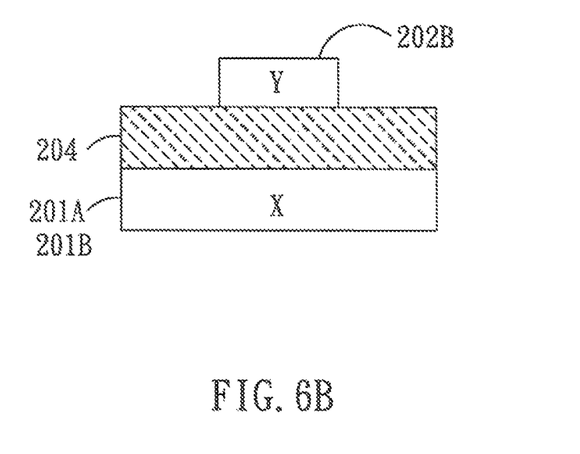

Some structures implementing the electrode pattern of the sensing electrode layer 20/20A/20B are disclosed as follows. FIG. 6A and FIG. 6B show an electrode pattern of multiple electrode layers, in which two axial sensing electrodes are disposed on different levels respectively. FIG. 6A is a partially enlarged view of FIG. 5A, and FIG. 6B is a cross-sectional view along a section line 6B-6B' of FIG. 6A. According to the figures, Y-axis electrode layer (202A and 202B) is disposed on a top level, and X-axis electrode layer (201A and 201B) is disposed on a bottom level. An insulating layer 204 is inserted between the top level and the bottom level in order to prevent shorting between the connecting conductive lines 201B and 202B. With respect to the second embodiment (FIG. 3), the insulating layer 204 may be substituted and shared with a (insulating) CR layer 16. Although the electrode exemplified in FIG. 6B includes, from bottom to top, the X-axis electrode layer (201A and 201B) the insulating layer 204, and the Y-axis electrode layer 202A, it is appreciated that the forming sequence may be inverted (that is, the Y-axis electrode layer, the insulating layer, and the X-axis electrode layer from bottom to top), and associated drawings and description are omitted for brevity.

Figure 7A:
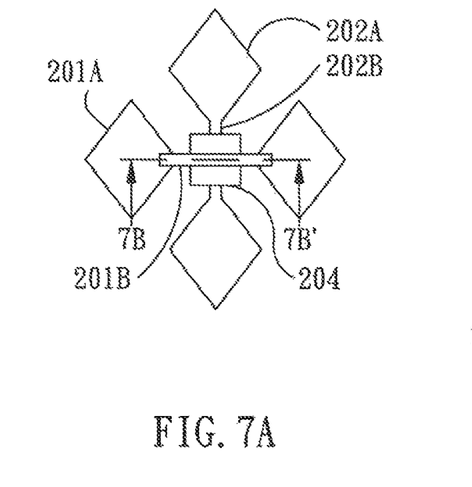
FIG. 7A and FIG. 7B show another electrode pattern of multiple electrode layers, in which two axial sensing electrodes are disposed on the same level.
Figure 7B:
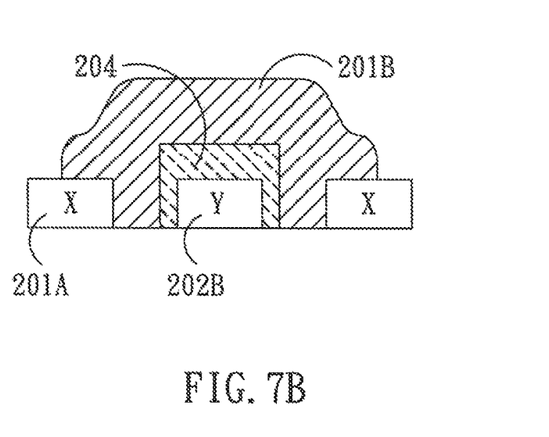

FIG. 7A and FIG. 7B show another electrode pattern of multiple electrode layers, in which two axial sensing electrodes are disposed on the same level. FIG. 7A is a partially enlarged view of FIG. 5A, and FIG. 7B is a cross-sectional view along a section line 7B-7B' of FIG. 7A. According to the figures. X-axis electrode layer 201A and Y-axis electrode layer 202B are disposed on the same level. An insulating layer 204 in a form of an isolation island covers the Y-axis electrode layer 202B in order to prevent shorting in an overlapping area between the connecting conductive lines 201B and 202B. Conductive material, such as metal or ITO, covers the insulating layer 204 to act as the X-axis connecting (or bridging) conductive line 201B. With respect to the second embodiment (FIG. 3), the insulating layer 204 may be substituted and shared with an (insulating) CR layer 16. The connecting conductive line 201B may be substituted with a (conductive) BM layer. Although the electrode exemplified in FIG. 7B includes, from bottom to top, the XY-axis electrode laser (201A and 202B) the insulating layer 204 and the connecting conductive line 201B, it is appreciated that the forming sequence may be inverted (that is, the connecting conductive line 201B the insulating layer 204, and the X/Y-axis electrode layer (201A and 202B) from bottom to top), and associated drawings and description are omitted for brevity.

Figure 7C:
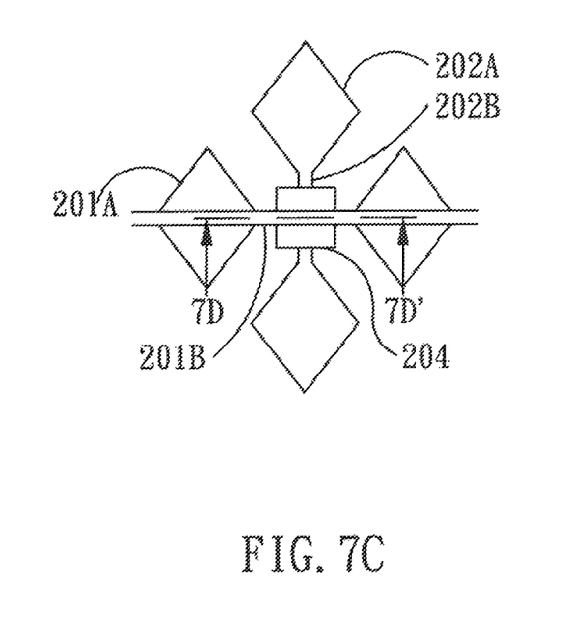
FIG. 7C shows an alternative structure of the electrode pattern of FIG. 7A.
Figure 7D:
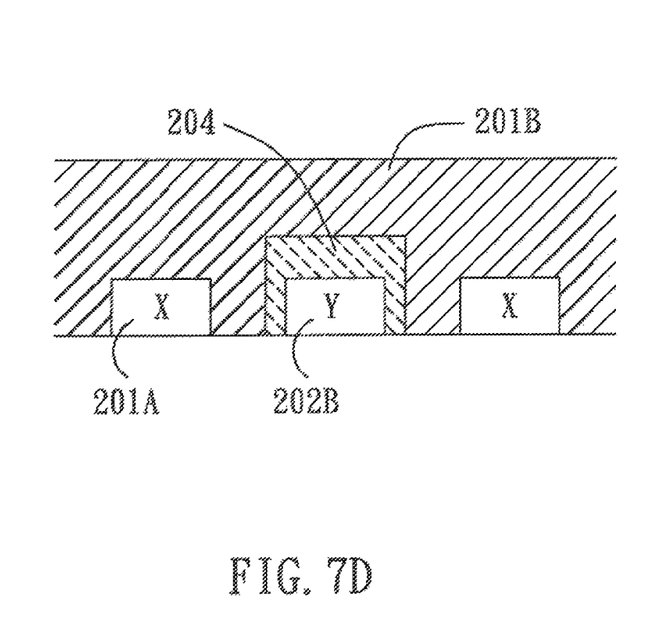
FIG. 7D is a cross-sectional view taken along a section line 7D-7D' of FIG. 7C.

FIG. 7C shows an alternative structure of FIG. 7A. Compared to FIG. 7A, the X-axis connecting conductive line 201B in FIG. 7C is a continuous line that extends along the X-axis electrodes 201A of the same row. The X-axis connecting conductive line 201B and the Y-axis connecting conductive line 202B may include the same or different material(s). FIG. 7D is a cross-sectional view along a section line 7D-7D of FIG. 7C.

Figure 8A:
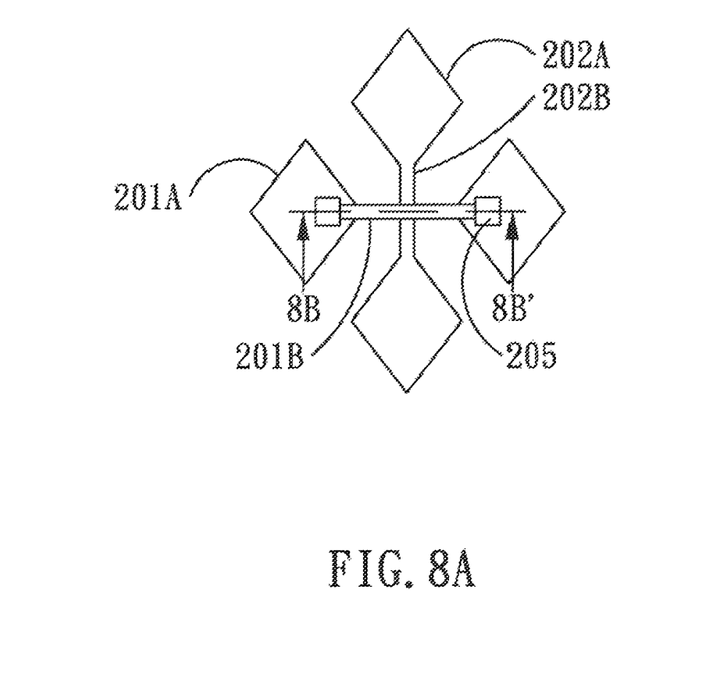
FIG. 8A and FIG. 8B show a hardier electrode pattern of multiple electrode layers, in which two axial sensing electrodes are disposed on the same level.
Figure 8B:
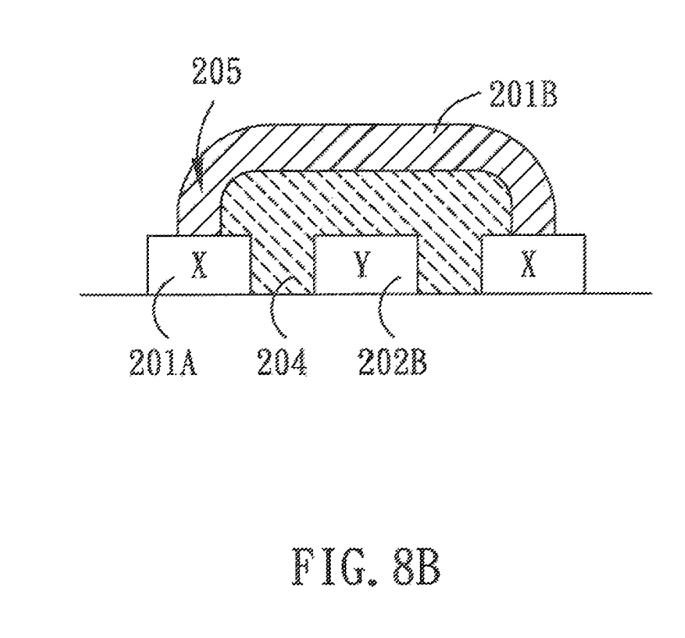

FIG. 8A and FIG. 8B show a further electrode pattern of multiple electrode layers, in which two axial sensing electrodes are disposed on the same level. FIG. 8A is a partially enlarged view of FIG. 5A, and FIG. 8B is a cross-sectional view along a section line 8B-8B' of FIG. 8A. According to the figures, X-axis electrode layer 201A and Y-axis electrode layer 202B are disposed on the same level. An insulating layer 204 blanket covers the X/Y-axis electrode layer (201A and 202B) in order to prevent, shorting in an overlapping area between the connecting conductive lines 201B and 202B. A via hole 205 is formed in the insulating layer 204 used for communicating between the X-axis sensing electrodes 201A, and the X-axis connecting conductive line 201B (such as metal or ITO) may be communicated with the X-axis sensing electrode 201A through the via hole 205. With respect to the second embodiment (FIG. 3), the insulating layer 204 may be substituted and shared with an (insulating) CR layer 16. The connecting conductive line 201B may be substituted with a (conductive) BM layer. Although the electrode exemplified in FIG. 8B includes, from bottom to top the X/Y-axis electrode layer (201A and 202B), the insulating layer 204, and the connecting conductive line 201B, it is appreciated that the forming sequence may be inverted that is, the connecting conductive line 201B, the insulating layer 204 and the X/Y-axis electrode layer (201A and 202B) from bottom to top), and associated drawings and description are omitted for brevity.

Figure 8C:
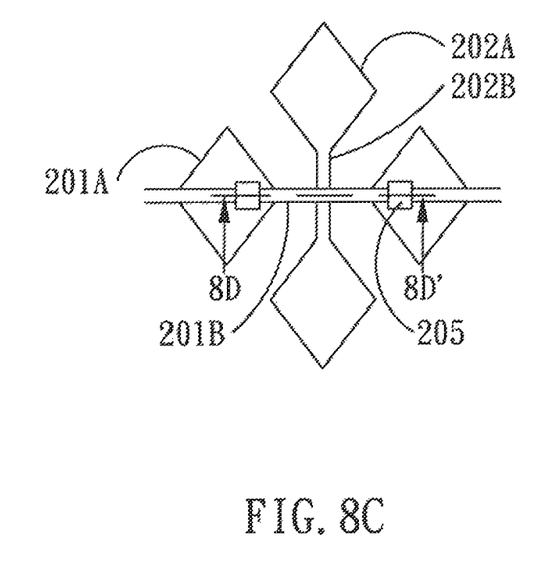
FIG. 8C shows an alternative structure of the electrode pattern of FIG. 8A.
Figure 8D:
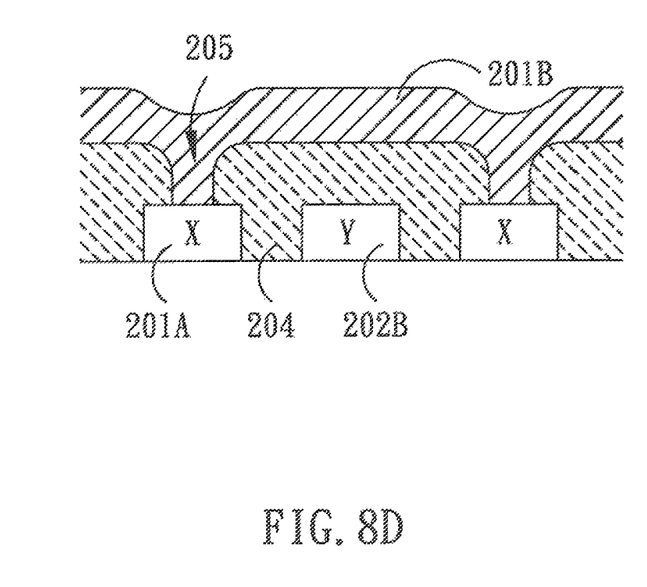
FIG. 8D is a cross-sectional view taken along a section line 8D-8D' of FIG. 8C.

FIG. 8C shows an alternative structure of FIG. 8A. Compared to FIG. 8A, the X-axis connecting conductive line 201B in FIG. 8C is a continuous line that extends along the X-axis electrodes 201A of the same row. The X-axis connecting conductive line 201B and the Y-axis connecting conductive line 202B may include same or different material(s). FIG. 8D is a cross-sectional view along a section line 8D-8D' of FIG. 8C.

Figure 9A:
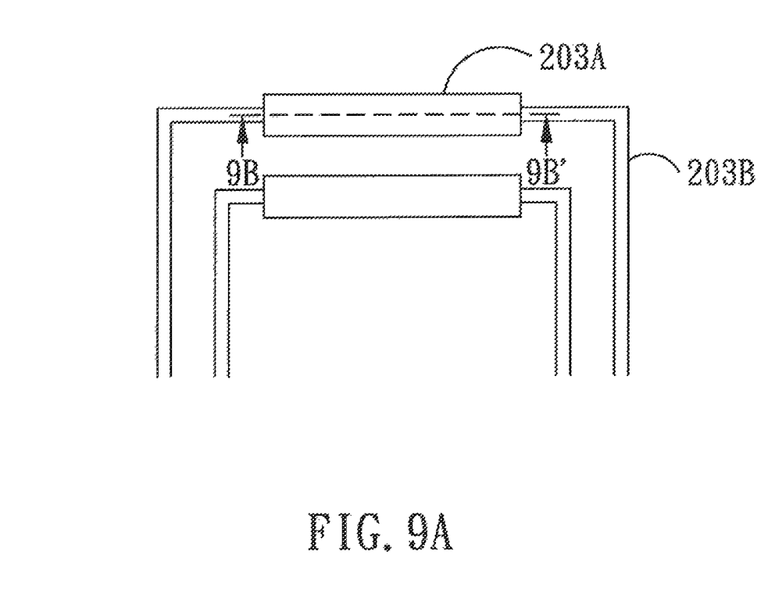
FIG. 9A and FIG. 9B show an electrode pattern of a single electrode layer.
Figure 9B:
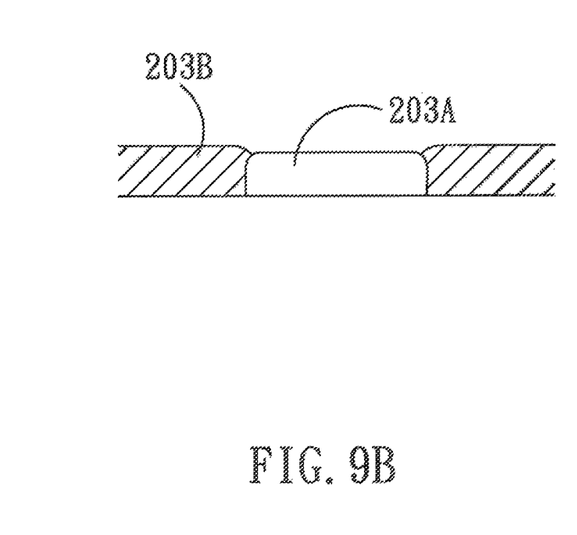

FIG. 9A and FIG. 9B show an electrode pattern of a single electrode layer. FIG. 9A is a partially enlarged view of FIG. 5B, and FIG. 9B is a cross-sectional view along a section line 9B-9B' of FIG. 9A. According to the figures, two ends of the sensing electrode 203A are coupled to conductive line 203B respectively (or, alternatively, a single conductive line 203B that is integrated with the sensing electrode 203A). The resistivity value of the conductive line 203B is usually lower than that of the sensing electrode 203A. For example, the conductive line 203B may include metal, and the sensing electrode 203A may include ITO. With respect to the second embodiment (FIG. 3), the sensing electrode 203A may include a combination/compound of a BM layer and a transparent conductive layer.

Figure 10:
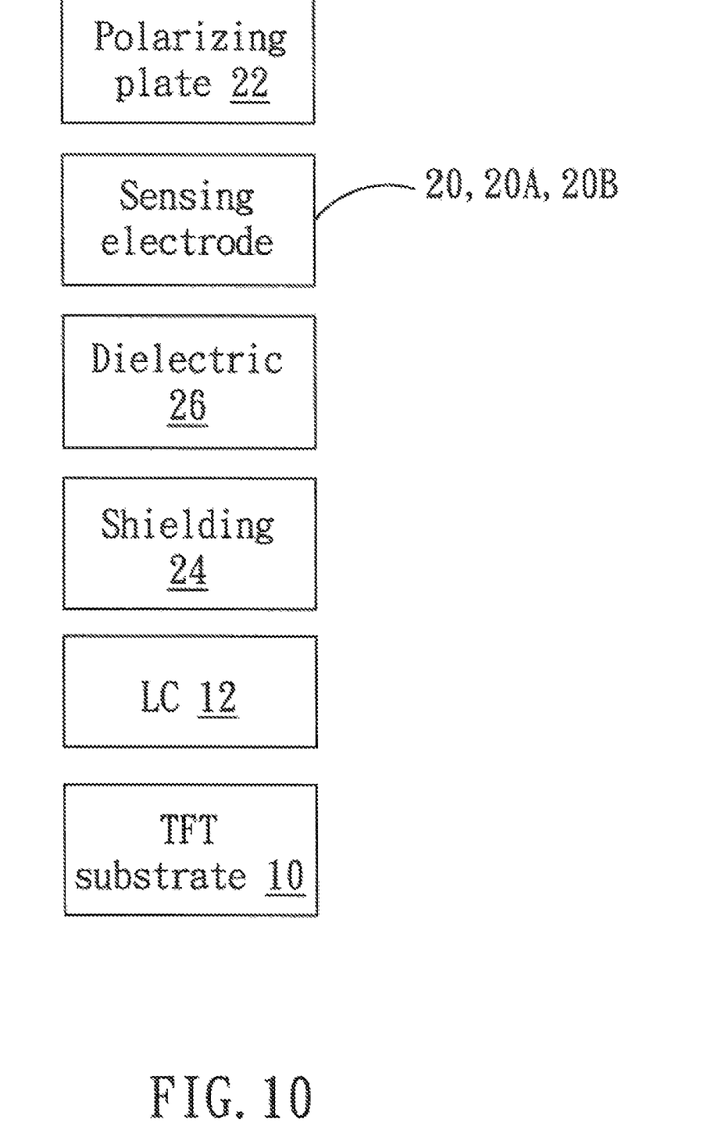
FIG. 10 is a cross-sectional view of a touch sensitive IPS LCD including a shielding layer.

According to another aspect of the present invention, at least one shielding layer 24 may be disposed between the sensing electrode layer (20/20A/20B) and the LC layer 12 for the purpose of preventing the sensing electrode layer (20/20A/20B) from being adversely affected by the electric field of the LC layer 12, as shown in the touch sensitive display of FIG. 10. An insulating layer 26 (such as glass, CR layer, and/or other insulating material(s)) may be disposed between the shielding layer 24 and the sensing electrode layer (20/20A/20B) in order to prevent shorting between the shielding layer 24 and the sensing electrode layer (20/20A/20B). As the BM layer usually includes a mesh structure, the shielding layer may accordingly be substituted and shared with a BM layer with adequate mesh density.

Although specific embodiments have been illustrated and described, it will be appreciated by those skilled in the art that various modifications may be made without departing from the scope of the present invention, which is intended to be limited solely by the appended claims.

What is claimed is:

1. A touch sensitive in-plane switching (IPS) liquid crystal display (LCD), comprising:
    a liquid crystal layer;
    an active-matrix transistor substrate disposed below the liquid crystal layer;
    an electrode pair formed on the active-matrix transistor substrate, the electrode pair comprising a pixel electrode disposed below the liquid crystal layer and a common electrode disposed below the liquid crystal layer, wherein a laterally horizontal electric field is generated between the pixel electrode and the common electrode for controlling orientation of liquid crystals of the liquid crystal layer in an IPS display mode;
    a color filter substrate disposed above the liquid crystal layer;
    a first sensing electrode layer disposed between the color filter substrate and the liquid crystal layer;
    a second sensing electrode layer disposed above the color filter substrate; and
    a color resist layer disposed between the first sensing electrode layer and the liquid crystal layer.

2. The display of claim 1, wherein:
    the first sensing electrode layer comprises a first-axis electrode layer that comprises a plurality of first sensing electrodes, wherein a first connecting conductive line is connected between the neighboring first sensing electrodes along a first axis; and
    the second sensing electrode layer comprises a second-axis electrode layer that comprises a plurality of second sensing electrodes, wherein a second connecting conductive line is connected between the neighboring second sensing electrodes along a second axis.

3. The display of claim 1, wherein:
    the first sensing electrode layer comprises a plurality of elongated first sensing electrodes that are spaced apart in parallel from each other along a first axis; and
    the second sensing electrode layer comprises a plurality of elongated second sensing electrodes that are spaced apart in parallel from each other along a second axis.

4. The display of claim 2, wherein the first connecting conductive line is a conductive black matrix layer.

5. The display of claim 1, wherein the first sensing electrode layer or the second sensing electrode layer is a combination of a black matrix layer and a transparent conductive layer.

6. The display of claim 1, further comprising a shielding layer disposed between the first sensing electrode layer and the liquid crystal layer.

7. The display of claim 6, wherein the shielding layer is a black matrix layer.

8. The display of claim 1, further comprising an over coating layer, wherein the over coating layer is disposed between the color resist layer and the liquid crystal layer.

9. A touch sensitive in-plane switching (IPS) liquid crystal display (LCD), comprising:
    a liquid crystal layer;
    an active-matrix transistor substrate disposed below the liquid crystal layer;
    an electrode pair formed on the active-matrix transistor substrate, the electrode pair comprising a pixel electrode disposed below the liquid crystal layer and a common electrode disposed below the liquid crystal layer, wherein a laterally horizontal electric field is generated between the pixel electrode and the common electrode for controlling orientation of liquid crystals of the liquid crystal layer in an IPS display mode;
    a color filter substrate disposed above the liquid crystal layer;
    a first sensing electrode layer disposed between the color filter substrate and the liquid crystal layer;
    a second sensing electrode layer disposed above the color filter substrate; and
    a color resist layer disposed between the first sensing electrode layer and the color filter substrate.

10. The display of claim 3, further comprising a plurality of conductive lines, wherein the conductive lines are connected to two ends of the elongated first sensing electrodes and two ends of the elongated second sensing electrodes.

11. The display of claim 10, wherein the electric resistivity values of the elongated first and the second sensing electrodes are lower than the electric resistivity value of the conductive lines.

12. The display of claim 1, further comprising a black matrix layer disposed between the liquid crystal layer and the first sensing electrode layer, wherein the black matrix layer serves as a shielding layer for preventing an electric interference between the liquid crystal layer and the first sensing electrode layer.

13. The display of claim 9, wherein:
the first sensing electrode layer comprises a first-axis electrode layer that comprises a plurality of first sensing electrodes, wherein a first connecting conductive line is connected between the neighboring first sensing electrodes along a first axis; and
the second sensing electrode layer comprises a second-axis electrode layer that comprises a plurality of second sensing electrodes, wherein a second connecting conductive line is connected between the neighboring second sensing electrodes along a second axis.

14. The display of claim 9, wherein:
the first sensing electrode layer comprises a plurality of elongated first sensing electrodes that are spaced apart in parallel from each other along a first axis; and
the second sensing electrode layer comprises a plurality of elongated second sensing electrodes that are spaced apart in parallel from each other along a second axis.

15. The display of claim 9, wherein the first sensing electrode layer or the second sensing electrode layer is a combination of a black matrix layer and a transparent conductive layer.

16. The display of claim 9, further comprising a shielding layer disposed between the first sensing electrode layer and the liquid crystal layer, wherein the shielding layer is a black matrix layer.

17. The display of claim 9, further comprising an over coating layer, wherein the over coating layer is disposed between the color resist layer and the liquid crystal layer.

18. The display of claim 14, further comprising a plurality of conductive lines, wherein the conductive lines are connected to two ends of the elongated first sensing electrodes and two ends of the elongated second sensing electrodes.

19. The display of claim 18, wherein the electric resistivity values of the elongated first and the second sensing electrodes are lower than the electric resistivity value of the conductive lines.

20. The display of claim 9, further comprising a black matrix layer disposed between the liquid crystal layer and the first sensing electrode layer, wherein the black matrix layer serves as a shielding layer for preventing an electric interference between the liquid crystal layer and the first sensing electrode layer.

* * * * *